United States Patent
Pal (10) Patent No.: US 10,921,792 B2
(45) Date of Patent: Feb. 16, 2021

(54) EDGE CLOUD-BASED RESIN MATERIAL DRYING SYSTEM AND METHOD

(71) Applicant: MachineSense, LLC, Baltimore, MD (US)

(72) Inventor: Biplab Pal, Ellicott City, MD (US)

(73) Assignee: MachineSense LLC, Baltimore, MD (US)

(*) Notice: Subject to any disclaimer, the term of this patent is extended or adjusted under 35 U.S.C. 154(b) by 93 days.

(21) Appl. No.: 16/229,353

(22) Filed: Dec. 21, 2018

(65) Prior Publication Data

US 2019/0265687 A1    Aug. 29, 2019

Related U.S. Application Data

(60) Provisional application No. 62/608,705, filed on Dec. 21, 2017.

(51) Int. Cl.
  *G05B 19/418* (2006.01)
  *G06N 20/00* (2019.01)

(52) U.S. Cl.
  CPC ....... *G05B 19/41875* (2013.01); *G06N 20/00* (2019.01); *G05B 2219/32366* (2013.01)

(58) Field of Classification Search
  None
  See application file for complete search history.

(56) References Cited

U.S. PATENT DOCUMENTS

| | | |
|---|---|---|
| 4,023,940 A | 5/1977 | Shultz |
| 4,131,011 A | 12/1978 | Ling |
| 5,150,289 A | 9/1992 | Badavas |
| 5,487,225 A | 1/1996 | Downie |
| 5,610,339 A | 3/1997 | Haseley et al. |
| 5,825,338 A | 10/1998 | Salmon et al. |
| 5,995,561 A | 11/1999 | Yamasaki et al. |
| 6,104,987 A | 8/2000 | Farnsworth |

(Continued)

FOREIGN PATENT DOCUMENTS

| | | |
|---|---|---|
| CN | 201672991 | 12/2010 |
| CN | 102539911 A | 7/2012 |

(Continued)

OTHER PUBLICATIONS

International Search Report and Written Opinion for PCT Application No. PCT/US16/18820; dated Aug. 4, 2016.

(Continued)

*Primary Examiner* — Ryan A Jarrett
(74) *Attorney, Agent, or Firm* — Fox Rothschild LLP (57) ABSTRACT

A method of evaluating factory production machinery up time and down time performance provides a collection of sensors in individual communication with factory production machinery, with each sensor collecting high frequency vector data as respecting a physical parameter associated with the machinery, extracts the data from the sensors to produce a sensor data set, transforms the data set into the frequency domain, extracts statistical and mathematical information from the data set, transfers the data set, to an associated edge cloud, and within the associated edge cloud processes the data set to provide a repair, maintenance and operation board for the machinery to evaluate up time and down time performance for the factory production machinery.

2 Claims, 4 Drawing Sheets

Architecture of Edge Cloud

(56) References Cited

U.S. PATENT DOCUMENTS

| | | |
|---|---|---|
| 6,289,606 B2 | 9/2001 | Gillette et al. |
| 6,330,525 B1 | 12/2001 | Hays |
| 6,405,108 B1 | 6/2002 | Patel et al. |
| 7,406,399 B2 | 7/2008 | Furem et al. |
| 7,882,394 B2 | 2/2011 | Hosek et al. |
| 7,938,935 B2 | 5/2011 | MacHattie et al. |
| 8,021,462 B2 | 9/2011 | Moretto |
| 8,094,034 B2 | 1/2012 | Patel et al. |
| 8,112,381 B2 | 2/2012 | Yuan et al. |
| 8,126,574 B2 | 2/2012 | Discenzo et al. |
| 8,150,340 B2 | 4/2012 | Albsmeier et al. |
| 8,334,784 B2 | 12/2012 | Patel et al. |
| 8,390,299 B2 | 3/2013 | Laepple et al. |
| 8,405,940 B2 | 3/2013 | Schweitzer, III et al. |
| 8,421,475 B2 | 4/2013 | Thiim |
| 8,433,443 B2 | 4/2013 | Hagerty et al. |
| 8,560,368 B1 | 10/2013 | Maity et al. |
| 8,571,904 B2 | 10/2013 | Guru et al. |
| 8,726,535 B2 | 5/2014 | Garrido et al. |
| 8,868,242 B2 | 10/2014 | Loutfi |
| 8,920,078 B2 | 12/2014 | Woolever |
| 9,052,216 B2 | 6/2015 | Kamel et al. |
| 9,062,536 B2 | 6/2015 | Fischer |
| 9,250,275 B2 | 2/2016 | Patel et al. |
| 9,781,243 B1 | 10/2017 | Huang |
| 10,041,844 B1 | 8/2018 | Brady |
| 2001/0038345 A1 | 11/2001 | Satoh et al. |
| 2002/0143421 A1 | 10/2002 | Wetzer |
| 2004/0102924 A1 | 5/2004 | Jarrell |
| 2004/0176926 A1 | 9/2004 | Edie |
| 2004/0199573 A1 | 10/2004 | Schwarz et al. |
| 2005/0049834 A1 | 3/2005 | Bottomfield |
| 2005/0222794 A1 | 10/2005 | Baird et al. |
| 2006/0137105 A1 | 6/2006 | Hong et al. |
| 2006/0168195 A1 | 7/2006 | Maturana et al. |
| 2006/0208169 A1 | 9/2006 | Breed et al. |
| 2006/0276949 A1 | 12/2006 | Beck et al. |
| 2007/0100518 A1 | 5/2007 | Cooper |
| 2007/0185685 A1 | 8/2007 | Lannes et al. |
| 2007/0193056 A1 | 8/2007 | Switalski |
| 2008/0103732 A1 | 5/2008 | Stoupis |
| 2008/0109185 A1 | 5/2008 | Cheung et al. |
| 2008/0289045 A1 | 11/2008 | Fryer |
| 2008/0294382 A1 | 11/2008 | Lim |
| 2009/0024359 A1 | 1/2009 | Bibelhausen et al. |
| 2009/0043518 A1 | 2/2009 | Roh et al. |
| 2009/0119243 A1 | 5/2009 | Yuan et al. |
| 2010/0023307 A1 | 1/2010 | Lee |
| 2010/0169030 A1 | 7/2010 | Parlos |
| 2010/0199352 A1 | 8/2010 | Hill et al. |
| 2010/0295692 A1 | 11/2010 | Bjorn |
| 2011/0016199 A1 | 1/2011 | De Carlo et al. |
| 2011/0131398 A1 | 6/2011 | Chaturvedi et al. |
| 2011/0137697 A1 | 6/2011 | Yedatore et al. |
| 2011/0216805 A1 | 9/2011 | Fernando et al. |
| 2011/0307220 A1 | 12/2011 | Lacaille |
| 2012/0045068 A1 | 2/2012 | Kim et al. |
| 2012/0166142 A1 | 6/2012 | Maeda et al. |
| 2012/0209569 A1 | 8/2012 | Becourt et al. |
| 2012/0213098 A1 | 8/2012 | Sun |
| 2012/0271576 A1 | 10/2012 | Kamel |
| 2012/0290104 A1 | 11/2012 | Holt et al. |
| 2012/0330499 A1 | 12/2012 | Scheid et al. |
| 2012/0330614 A1 | 12/2012 | Kar |
| 2013/0102284 A1 | 4/2013 | Storozuk |
| 2013/0119047 A1 | 5/2013 | Driussi |
| 2013/0170417 A1 | 7/2013 | Thomas et al. |
| 2013/0173178 A1 | 7/2013 | Poczka et al. |
| 2013/0201316 A1 | 8/2013 | Binder et al. |
| 2013/0268469 A1 | 10/2013 | Sharma et al. |
| 2013/0287060 A1 | 10/2013 | Langdoc et al. |
| 2013/0304677 A1 | 11/2013 | Gupta et al. |
| 2013/0318022 A1 | 11/2013 | Yadav et al. |
| 2014/0129164 A1 | 5/2014 | Gorbold |
| 2014/0132418 A1 | 5/2014 | Lill |
| 2014/0163416 A1 | 6/2014 | Shuck |
| 2014/0186215 A1 | 7/2014 | Shinta et al. |
| 2014/0207394 A1 | 7/2014 | Madden |
| 2014/0223767 A1 | 8/2014 | Arno |
| 2014/0244836 A1 | 8/2014 | Goel et al. |
| 2014/0262130 A1 | 9/2014 | Yenni |
| 2014/0309805 A1 | 10/2014 | Ricci |
| 2014/0314284 A1 | 10/2014 | Movellan et al. |
| 2014/0335480 A1 | 11/2014 | Asenjo et al. |
| 2014/0336791 A1 | 11/2014 | Asenjo et al. |
| 2014/0337429 A1 | 11/2014 | Asenjo et al. |
| 2015/0026044 A1 | 1/2015 | Refaeli |
| 2015/0039250 A1 | 2/2015 | Rank |
| 2015/0094914 A1 | 4/2015 | Abreu |
| 2015/0139817 A1 | 5/2015 | Kowalski |
| 2015/0181313 A1 | 6/2015 | Murphy |
| 2015/0185251 A1 | 7/2015 | Heydron et al. |
| 2015/0233792 A1 | 8/2015 | Gao |
| 2015/0233856 A1 | 8/2015 | Samuilov et al. |
| 2015/0247670 A1 | 9/2015 | Robertson et al. |
| 2015/0261215 A1 | 9/2015 | Blevins |
| 2016/0086285 A1 | 3/2016 | Jordan Peters et al. |
| 2016/0147205 A1 | 5/2016 | Kaufman |
| 2016/0189440 A1 | 6/2016 | Cattone |
| 2016/0209831 A1 | 7/2016 | Pal |
| 2016/0245279 A1 | 8/2016 | Pal et al. |
| 2016/0245686 A1 | 8/2016 | Pal et al. |
| 2016/0245765 A1 | 8/2016 | Pal |
| 2016/0291552 A1 | 10/2016 | Pal et al. |
| 2016/0299183 A1 | 10/2016 | Lee |
| 2016/0313216 A1 | 10/2016 | Pal et al. |
| 2016/0349305 A1 | 12/2016 | Pal |
| 2017/0006135 A1 | 1/2017 | Siebel |
| 2017/0032281 A1 | 2/2017 | Hsu |
| 2017/0060574 A1 | 3/2017 | Malladi et al. |
| 2017/0061608 A1 | 3/2017 | Kim et al. |
| 2017/0163444 A1 | 6/2017 | McLaughlin et al. |
| 2017/0201585 A1 | 7/2017 | Doraiswamy et al. |
| 2020/0067789 A1* | 2/2020 | Khuti .................. G06N 5/046 |

FOREIGN PATENT DOCUMENTS

| | | |
|---|---|---|
| CN | 103399486 A | 11/2013 |
| CN | 203362223 U | 12/2013 |
| CN | 203588054 U | 5/2014 |
| CN | 104036614 A | 9/2014 |
| EP | 1836576 B1 | 2/2012 |
| EP | 2186613 B1 | 5/2013 |
| EP | 2648393 A1 | 10/2013 |
| WO | WO 2005/086760 A2 | 9/2005 |
| WO | WO 2010/104735 A1 | 9/2010 |
| WO | WO 2013/040855 A1 | 3/2013 |
| WO | WO 2013-041440 A1 | 3/2013 |
| WO | WO 2013/093942 A2 | 6/2013 |
| WO | WO 2014/044906 A1 | 3/2014 |
| WO | WO 2014/085648 A1 | 6/2014 |
| WO | WO 2014/089567 A2 | 6/2014 |
| WO | WO 2014/117245 A1 | 8/2014 |
| WO | WO 2015/022036 A1 | 2/2015 |
| WO | WO 2016/137848 A1 | 9/2016 |
| WO | WO 2017-1234525 A1 | 7/2017 |

OTHER PUBLICATIONS

International Search Report and Written Opinion for PCT Application No. PCT/US15/066547; dated Mar. 17, 2016.

Sensors Drive Mobile IoT; Wong, William; Jan. 26, 2015; Electronic Design.

International Search Report and Written Opinion for PCT Application No. PCT/US16/028724; dated Aug. 22, 2016.

International Search Report and Written Opinion for PCT Application No. PCT/US16/18831; dated Aug. 12, 2016.

Fault Detection in Kerman Combined Cycle Power Plant Boilers by Means of Support Vector Machine Classifier Algorithms and PCA by M. Berahman, et al., 3rd International Conference on Control, Instrumentation, and Automation (ICCIA 2013), Dec. 28-30, 2013, Tehran, Iran.

(56) References Cited

OTHER PUBLICATIONS

Fault Monitoring and Diagnosis of Induction Machines Based on Harmonic Wavelet Transform and Wavelet neural Network by Qianjin Guo, et al., dated Sep. 2008, published at the Fourth International Conference on Natural Computation.
Fault Diagnosis Method Study in Roller Bearing Based on Wavelet Transform and Stacked Auto-encoder, by Junbo Tan, et al., dated Feb. 2015, published by IEEE.
A Diagnostic Expert System Embedded in a Portable Vibration Analysis Instrument by Dr. Robert Milne, et al., dated May 13, 1991, published at IEE Colloquium on Intelligent Instrumentation.
Detection of Precursor Wear Debris in Lubrication Systems by Jack Edmonds, et al., dated May 2000, published by IEEE.
Fault Diagnosis of Bearing Based on Fuzzy Support Vector Machine, by Haodong Ma, et al., dated Jan. 2015, published by IEEE.
Investigation of the Mechanical Faults Classification using Support Vector Machine Approach by Zhiqiang Jiang, et al., dated Aug. 2010, 2010 Second International Conference on Intelligent Human-Machine Systems and Cybernetics.
Impact Characterization of Multiple-Points-Defect on Machine Fault Diagnosis by Muhammad F. Yaqub, et al., 8th IEEE International Conference on Automation Science and Engineering, Aug. 20-24, 2012, Seoul, Korea.
Detection of Generalized-Roughness Bearing Fault by Spectral-Kurtosis Energy of Vibration or Current Signals by Fabio Immovilli, et al., IEEE Transations on Industrial Electronics, vol. 56, No. 11, Nov. 2009.
Intrinsic Mode Function Determination of Faulty Rolling Element Bearing Based on Kurtosis by Wei Kang, et al., Proceeding of the 2015 IEEE International Conference on Information and Automation, Lijiang, China, Aug. 2015.
Condition Monitoring and Fault Diagnosis of Rolling Element Bearings Based on Wavelet Energy Entropy and SOM by Shuai Shi, et al., dated Aug. 2012, published by IEEE.
Continuous Hidden Markov Model Based Gear Fault Diagnosis and Incipient Fault Detection by Jian-She Kang, et al., dated Jun. 2011, published by Institute of Electrical and Electronics Engineers (IEEE).
Study on Fault Diagnosis of Gear with Spall using Ferrography and Vibration Analysis by Wei Feng, et al., published in Aug. 2009 at the International Conference on Measuring Technology and Mechatronics Automation.
International Search Report and Written Opinion for PCT Application No. PCT/US2016/067814; dated Apr. 6, 2017.
International Search Report and Written Opinion for PCT Application No. PCT/US2016/067546; dated Apr. 11, 2017.
Krishnamurthy, S. et al. (2008) Automation of Facility Management Processes Using Machine-to-Machine Technologies. In: Floerkemeier C., Langheinrich M., Fleisch E., Mattern F., Sarma S.E. (eds) The Internet of Things. Lecture Notes in Computer Science, vol. 4952. DOI:10.1007/978-3-540-78731-0_5 (Year: 2008).
Holler, J. et al. (2014). "From Machine-to-machine to the Internet of Things: Introduction to a New Age of Intelligence." Chapters 2, 4, 5, 7, 10, 12. Academic Press. DOI:10.1016/B978-0-12-407684-6.00002-4 (Year: 2014).
Azure IoT Edge open for developers to build for the intelligent edge, George, Sam; Azure Internet of Things; Nov. 15, 2017.
Predix Edge Technology Product Brief, General Electric, 2017.
http://ieeexplore.ieee.org/document/8089336/ Future Edge Cloud and Edge Computing for Internet of Things Applications—Janali Pan et al.
Challenges and Solutions of Protecting Variable Speed Drive Motors; Aversa, et al.; Feb. 11, 2013; Presented at the 2013 Texas A&M Conference for Protective Relay Engineers.
Dec. 21, 2018 Non-Final Office Action against Applicant's co-pending U.S. Appl. No. 14/833,111.
Vasudevan, Shobha, "Still a Fight to Get It Right: Verification in the Era of Machine Learning", 2017 IEEE International Conference on Rebooting Computing (ICRC), Washington, DC, 2017, pp. 1-8. (Year: 2017).

* cited by examiner

FIG. 3: Architecture of Edge Cloud

Fig-4 Architecture of Virtual Edge Cloud and Public Cloud

EDGE CLOUD-BASED RESIN MATERIAL DRYING SYSTEM AND METHOD

CROSS REFERENCE TO RELATED PATENT APPLICATIONS

This patent application claims the priority under 35 USC 120 of U.S. Provisional Application Ser. No. 62/608,705 filed 21 Dec. 2017 in the name of Biplab Pal and entitled "Dryer Maintenance Prediction Method and Apparatus".

STATEMENT REGARDING FEDERALLY SPONSORED RESEARCH OR DEVELOPMENT

Not applicable—this invention was conceived and developed entirely using private source funding; this patent application is being filed and paid for entirely by private source funding.

INCORPORATION BY REFERENCE

Applicant incorporates by reference the disclosures of the following United States patent Publications:

US 2018/0077522 A1, published 15 Mar. 2018, entitled "Predicting Dryer Maintenance Using Machine Wearables";

US 2017/0178030 A1, published 22 Jun. 2017, entitled "Method, System And Apparatus Using Field Learning To Upgrade Trending Sensor Curves Into Fuel Gauge Based Visualization Of Predictive Maintenance By User Driven Feedback Mechanism;"

US 2016/0245765 A1, published 21 Feb. 2016, entitled "Method For Accurately Measuring Real-Time Dew-Point Value And Total Moisture Content Of A Material";

US 2016/0245279 A1, published 23 Feb. 2015, entitled "Real Time Machine Learning Based Predictive and Preventive Maintenance of a Vacuum Pump";

US 2017/0051978 A1, published 23 Aug. 2015, entitled "Machine Learning Based Predictive Maintenance of a Dryer";

US 2017/0011298 A1, published 2 Jul. 2015, entitled "Internet of Things Based Determination of Machine Reliability and Automated Maintenance, Repair, and Operation (MRO) Logs";

US 2016/0313216 A1, published 6 Nov. 2015, entitled "Fuel Gauge Visualization of IOT Based Predictive Maintenance System Using Multi-Classification Based Machine Learning";

US 2016/0291552 A1, published 2 Dec. 2015, entitled "System For Rule Management, Predictive Maintenance And Quality Assurance Of A Process And Machine Using Reconfigurable Sensor Networks And Big Data Machine Learning";

US 2017/0160328 A1, published 2 Dec. 2015, entitled "Distributed IOT Based Sensor Analytics for Power Line Diagnosis";

US 2016/0245686 A1, published 22 Dec. 2015, entitled "Fault Detection In Rotor Driven Equipment Using Rotational Invariant Transform Of Sub-Sampled 3-Axis Vibrational Data";

US 2017/0201585 A1, published 13 Jul. 2017, entitled "Distributed Edge Processing of Internet of Things Device Data in Co-Location Facilities";

US 2017/0060574, published 2 Mar. 2017, entitled "Edge Intelligence Platform and Internet of Things Censor Stream System";

US 2017/0163444, published 8 Jun. 2017, entitled "Apparatus and Method for Using and Internet of Things Edge Secure Gateway"

US 2017/123425, published 20 Jul. 2017, entitled "Distributed Edge Processing of Internet of Things Device Data in Co-Location Facilities".

DESCRIPTION OF THE PRIOR ART

The term "cloud" has become familiar not only to data processing professionals but also to anyone familiar with computer technology on anything more than a casual basis. The so-called "cloud" is made up of more than 10,000 data centers scattered over the world. In the next five years, driven by the need to get data, solutions and applications closer to the user, hundreds of thousands of scaled-down data centers are expected to sprout up at the edge of the Internet network, to form what is sometimes collectively called the "edge cloud". Accordingly, edge cloud computing means computing that makes use of or is performed wholly or partially in such scaled-down data centers defining the "edge cloud".

In todays networked world, data centers run by large entities such as Amazon, Google, Equinox, DRT, and the like are interconnected and stream data, information, and applications, namely software, over the Internet to end users. Large providers of content lease capacity in data centers or operate their own data centers. Global operations such as Amazon have one, two, or more data centers per continent. These large data centers may be considered to sit at the virtual center of the cloud, meaning they are all well removed, distance wise, from the end users.

There is burgeoning activity involving applications and content, which activities include streaming video to mobile devices, "wait-and-see" sensitive Internet computing, data, software applications, and security filters, all that need to be pushed into the Internet network, namely closer to the edge of the Internet network and therefore closer to the user, in order that these applications, data, software, etc., may be accessed quickly and may provide their data, information, results, etc., faster to the Internet users. This shift to "edge cloud computing" is necessitated by a number of factors, with latency, namely the delay before a transfer of data begins following an instruction for its transfer, being the most often cited reason. Cost is also always a concern.

Accordingly, growth of the edge cloud is driven by the need to get data and applications closer to users. Hence, the edge cloud, in the broadest sense, is composed of orders of magnitude more data centers, each desirably being scaled down and each desirably being a shorter distance from the relevant end users. The rationale for the edge cloud is that if an application runs on a processor at a location closer to the user, latency is reduced as the data traverses a shorter segment of the Internet network, thereby ultimately reducing the resources required. By contrast, when compared to the conventional centralized data center world, in a major metropolitan area when information, data, etc., travels from a data center to the end user, the information, data, etc., might have to go through many routers and run over thousands of miles of fiber optics on its journey to the end user. As a result the transport costs and potentials for delay are considerable. The edge cloud approach minimizes if not eliminates these delays and associated risks and reduces costs.

Computing using edge cloud is currently used in factories and in public clouds such as those operated by Amazon, AWS, and Rack Space, for low latency scalable computations in Industrial Internet of Things applications. Such computing strategy, namely using the edge cloud, has gained momentum recently in both academic and industrial applications. It is acknowledged in current computational strategy that edge cloud computing could bring several advantages to Internet of Things applications, such as permitting low latency real time analytics that are needed for industrial control, providing lower cost of data processing, and providing more efficient computation, all as compared to use of the public cloud.

Contrasting, the visualization available through the public cloud facilitates low latency downloads for mobile and web application users who may be accessing information and formatting and computing data anywhere in the world.

There are already millions of "things" in the world of the Internet of Things, connected together using and through the public cloud, which "things" do not use any edge cloud computational capabilities.

SUMMARY OF THE INVENTION

In one of its aspects, this invention provides a "hybrid cloud" inclusive architecture for use in edge cloud computing, which addresses both brown field scenarios and green field scenarios.

In another of its aspects, this invention provides an integrated hybrid cloud architecture allowing a system of sensors to work seamlessly both with and without edge cloud computing capability. This aspect of the invention is particularly useful for new Industrial Internet of Things entrants experimenting with a few Internet of Things sensors. The overhead cost of edge cloud computing may be too high for those entrants seeking to provide an introductory proof of some concept.

The following detailed description is merely exemplary in nature and is not intended to limit the described embodiments of the invention or uses of the described embodiments. As used herein, the words "exemplary" and "illustrative" mean "serving as an example, instance, or for illustration." Any implementation or embodiment or abstract disclosed herein as being "exemplary" or "illustrative" is not necessarily to be construed as preferred or advantageous over other implementations, aspects, or embodiments. All of the implementations or embodiments described in the detailed description are exemplary implementations and embodiments provided to enable persons of skill in the art to make and to use the implementations and embodiments as disclosed below, to otherwise practice the invention, and are not intended to limit the scope of the invention, which is defined by the claims.

Furthermore, by this disclosure, there is no intention on the part of the Applicant to be bound by any express or implied theory presented in the preceding materials, including but not limited to the summary of the invention or the description of the prior art, or in the following detailed description of the invention. It is to be understood that the specific implementations, devices, processes, aspects, and the like illustrated in the attached drawings and described in the following portion of the application, usually referred to as the "specification," are simply exemplary embodiments of the inventive concepts defined in the claims. Accordingly, specific dimensions and other physical characteristics relating to the embodiments disclosed herein are not to be considered as limiting as respecting the invention unless the claims or the specification expressly state otherwise.

DESCRIPTION OF THE INVENTION

As used herein, the term "Fog" means computation in the sensor electronics itself, while "Core" means computation in a central server. In accordance with the invention, for complex Industrial Internet of Things analytics, there are at least five layers of computation that are important. The five layers, or protocols of computation are as follows:

Fog 1: Where high frequency vector data is extracted from the sensors and transformed, either in the time domain or in the frequency domain, to produce a sensor data set.

Fog 2: Where useful, statistical, and mathematical information is extracted from a transformed sensor data set.

Core 1: Where data and features for one or multiple sensors are used in computations, using either a rule based algorithm or a machine learning engine, to predict reliability and performance and to provide further analytics for a machine or a process.

Core 2: Where the analytics obtained for a machine or process, preferably from Core 1, are used for one or more secondary layers or analytics such as a repair, maintenance, and operation board for the machine or process, or a rule set for the machine or process.

Core 3: Where data obtained preferably using the Core 2 protocol, is further used to process more advanced analytics such as the up time or down time performance of a factory in which machines having the sensors associated therewith are located.

In the traditional edge of "Fog" computing paradigm, the "Fog" computation, either Fog 1 or Fog 2 as identified above, increases the cost of sensor electronics as they necessarily use at least one gigabit or more of random access memory and require at least one gigahertz or higher processor speed. Performing core computing in the public cloud as per computations Core 2, Core 2, and Core 3 above, increases the cloud computing costs. This invention addresses this problem by providing a edge cloud architecture as a system for merging layers of computation one through five, namely Fog 1 and 2, and Core 1, 2, and 3 as identified above, into the edge cloud by performing them in the edge cloud and thus reducing the cost of hardware and the cost of a cloud subscription simultaneously, through the single architecture in accordance with the invention.

In addition to the computations described in the five protocols identified above, analytics obtained from the third and fourth protocols, Core 1 and Core 2, are used in accordance with the invention to provide real time feed data to control systems. The edge cloud computation approaches in accordance with the invention use soft integration of the layer consisting of either the third or fourth protocol, namely Core 1 and Core 2 identified above, with the system of the factory. The invention provides such edge cloud protocol for integration of the control plan with the edge cloud computations.

Specific to the problem of predictive maintenance where feedback is required from the users of the adaptive predictive analytics respecting maintenance issues in a course of computing within protocols three and four above, the invention in one of its aspects runs local and global adaptive predictive analytics. The hybrid cloud architecture of the invention caters to both of those needs, namely the local protocol is optimally only a single edge cloud computation, whereas the predictive analytics global uses multiple feedback from plural edge cloud computational protocols.

Fog level computation, in sensor electronics within or attached to the sensors, is vulnerable to cyber-attack, since typically there are many such devices in a single factory. In factories that are resource limited, advanced security measures are difficult to implement. This makes the entire factory network vulnerable to cyber attack and is one of the weakest points of the Industrial Internet of Things. With edge cloud computing in accordance with the invention, and now in the course of using proprietary protocols in accordance with the invention, preferably sensor devices used in the practice of the invention are ones that talk only to the associated edge cloud and to nothing else. In this way a factory Wi-Fi or Ethernet network in accordance with the invention remains much safer and essentially immune from compromise of the sensor devices. The invention accomplishes this with the edge cloud architecture addressing the critical issue of network security by use of proprietary protocol layers, all as disclosed and claimed herein.

Figure 1:
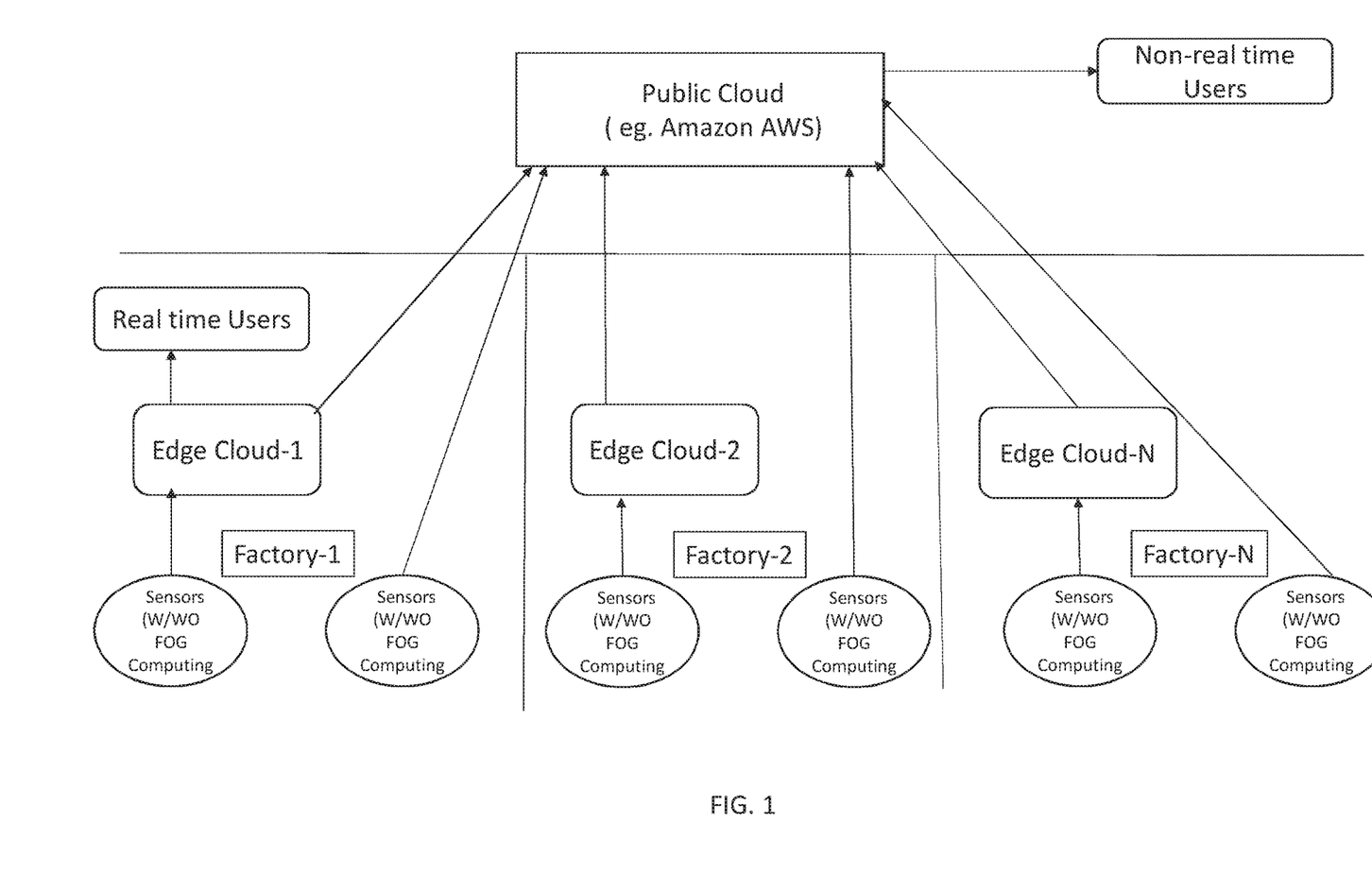
FIG. 1 is a schematic diagram of a system, in accordance with the invention, illustrating system interaction among a sets of sensors, the sensors being both with and without computational capabilities and electronics, and being located in different factory facilities, providing data to associated edge clouds and to the public cloud.

As described above, FIG. 1 depicts a system in accordance with the invention, in which a set of sensors, with or without integrated computational capabilities and electronics, are sending data to an edge cloud, and to a low cloud in the case of real time and non-real time users, and to the public cloud. FIG. 1 further depicts legacy sensors sending data to the public cloud directly, since such legacy sensors are normally without edge cloud support. New sensors can communicate with end users via the edge cloud or, as often is the case of smaller scale operations, can connect to the public cloud directly, all as illustrated in FIG. 1.

Further regarding FIG. 1, two kinds of visualization are illustrated schematically where the public cloud provides visualization, which is non-real time but is available anywhere, while edge clouds serve the need for real-time visualization within the associated factory premises, with a user's viewing device and an associated edge cloud all connected to the same subnetwork. This is illustrated in FIG. 1. There could be hundreds of edge clouds in the system as illustrated in FIG. 1.

Figure 2:
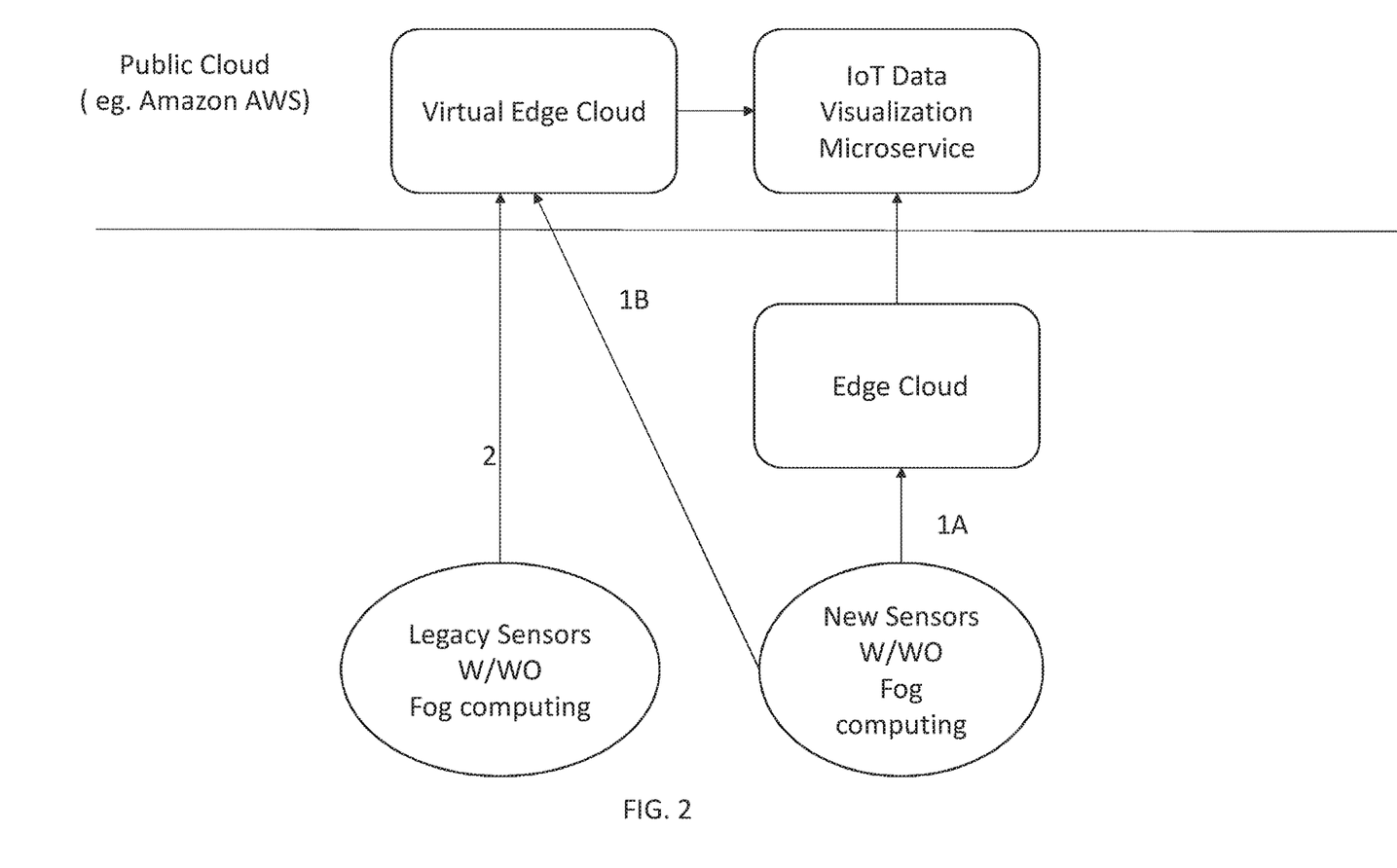
FIG. 2 is a schematic flow chart depicting connection of legacy sensors and new sensors to a virtual edge cloud in accordance with aspects of the invention.

As described above FIG. 2 is a schematic flow chart depicting different ways of connecting legacy sensors, which have already been deployed in the field and work without any edge cloud, and new sensors; the connection is performed using virtual edge cloud, which is sometime abbreviated herein as "VEC". In the schematic diagram of FIG. 2, the public cloud should be understood as being composed of two major functional blocks, namely a virtual edge cloud and an Internet of Things visualization micro service, both as shown. Still referring to FIG. 2, the virtual edge cloud is similar to an ordinary edge cloud, but the virtual edge cloud is scalable for many more sensors and does not facilitate real time visualization. With the virtual edge cloud, in accordance with the invention sensor data, whether processed using an edge cloud approach or in the public cloud, creates the same level of non-real time visualization. However, sensor data processed by the virtual edge cloud and without use of edge cloud per se, does not provide for real time visualization in the factory, all as illustrated schematically in FIG. 2.

Figure 3:
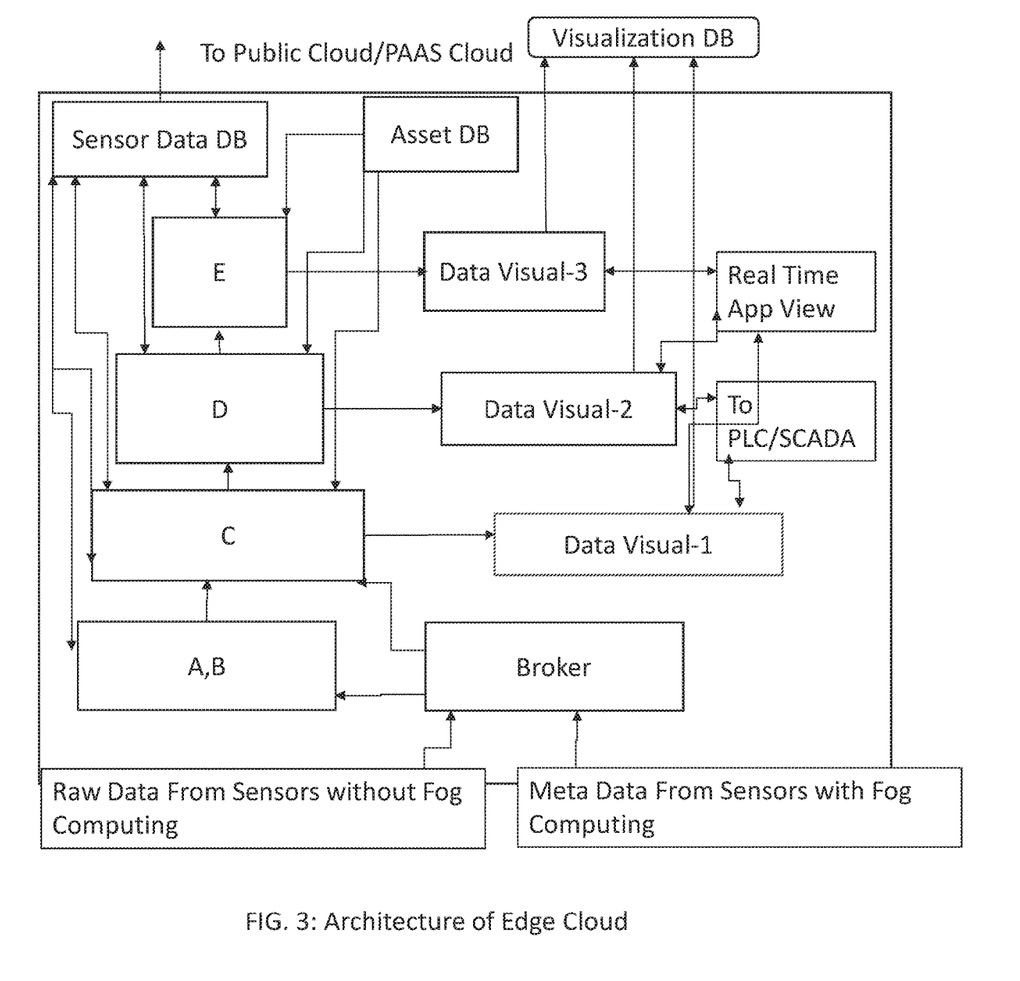
FIG. 3 is a schematic block diagram illustrating a preferred system architecture in accordance with the invention.

As noted above, FIG. 3 is a block diagram illustrating the architecture of the instant invention. In FIG. 3, it is understood that in edge cloud, as known in distributed computing, it is important to distribute to and from all of the Industrial Internet of Things sensors information into five layers, with each layer being defined by a modular computational block as illustrated in FIG. 3. These computational layers are respectively in series in the illustrated hierarchy as follows:

Fog 1: This layer of the protocol of the invention includes high frequency vector data such as vibration information, current information, magnetic field information and the like, which is extracted from associated sensors connected to one or more machines in a factory with which the edge cloud of interest is associated. The vector data is transformed into either the time domain or the frequency domain.

Fog 2: This layer of the protocol of the invention involves useful statistical and mathematical data, including moments, peak to root mean square ratio and other parameters of physical data that are extracted from a transformed data set created in the Fog 1 layer.

Core 1: This layer of the protocol of the invention involves data for all the features for sensors using either a rule based or a machine learning engine approach and processing the same with a support vector machine or a random forest software, to predict reliability and provide analytics on the machine(s) on which the sensors reside.

Core 2: This layer of the protocol of the invention involves the analytics obtained for one or more machine from the Core 1 layer to form secondary layers of analytics such as machine repair and operation data, which may be provided on a dashboard or some other display device.

Core 3: This layer of the protocol of the invention involves data obtained from the layer identified as Core 2 and is further used to process more advanced enterprise resource planning software in order to evaluate parameters such as overall uptime or downtime performance of a factory or other facility.

In the practice of the invention each of the distributed computational layers described above requires three different data types. One of these data types is machine information or sensor information regarding which sensors are mounted on what kind of machines, the make or model of the machine, and the analytics required. This asset database includes unstructured text, image, and sound data captured from a machine for adaptive boosting of the analytics.

A second data type needed by each of the distributive computational layers is time series meta data processed from an earlier block in real time. So, as an example referring to FIG. 3, layer C receives metadata from computation in layer B., computation layer D receives metadata from computational layer C, and so on.

The third data type needed by each of the distributive computation layers is time series metadata stored from each block in a sensor time series database, with the data being from the relatively recent past. In the industrial and commercial contexts typically this will be data from the last two hours or two days of operation of the facility.

Each of the computational layers receives data via a broker service.

In the course of practice of the invention, data input to the edge cloud of interest can be raw sensor data, without layer A or layer B processing, or can be metadata generated by a computation in layer B. If a sensor with a Fog device is connected to the edge cloud, the sensor will send metadata directly to computing layer C for use thereby. Otherwise, raw sensor data is processed by and within layer A.

In the course of practice of the invention, metadata output from processing layers C, D, and E are preferably sent to the public cloud, and to a programmable logic controller/supervisory control and data acquisition system.

Raw sensor data is preferably input directly to edge cloud in one embodiment of the invention without processing by computation layers A and B. Alternatively, raw sensor data is metadata generated by computational layer B and then supplied to the edge cloud. In the embodiment of the invention where a sensor with a Fog device is connected to the edge cloud of interest, the invention sends metadata directly to layer C for processing. Otherwise in the preferred practice of the invention, raw data is processed in the edge cloud as it is received from computational layer A.

In the course of practice of the invention, metadata output from processing layers C, D, and/or E is sent to the public cloud, or to a programmable logic controller/supervisory control and data acquisition system, or to a hybrid programmable logic controller/supervisory control and data acquisition system, and/or to a real time listening service. Time series metadata is sent to be stored at a time series data base locally in the associated edge cloud. This time series database is synchronized and backed up with the time series database of the public cloud so that in the event of damage to the particular localized edge cloud of interest, no data is lost.

In the course of practice of the invention, visualization data, which can be JSON formatted data as required for analytic visualization, is sent to a visualization database in the public cloud.

The visualization data in another format is preferably sent to a mobile or other visualization device within the particular factory; these devices are preferably connected to the same subnetwork within the particular factory.

Yet another format of the visualization data, which will be formatted for an industrial bus, is preferably sent to the hybrid programmable logic controller/supervisory controller and data acquisition system.

Figure 4:
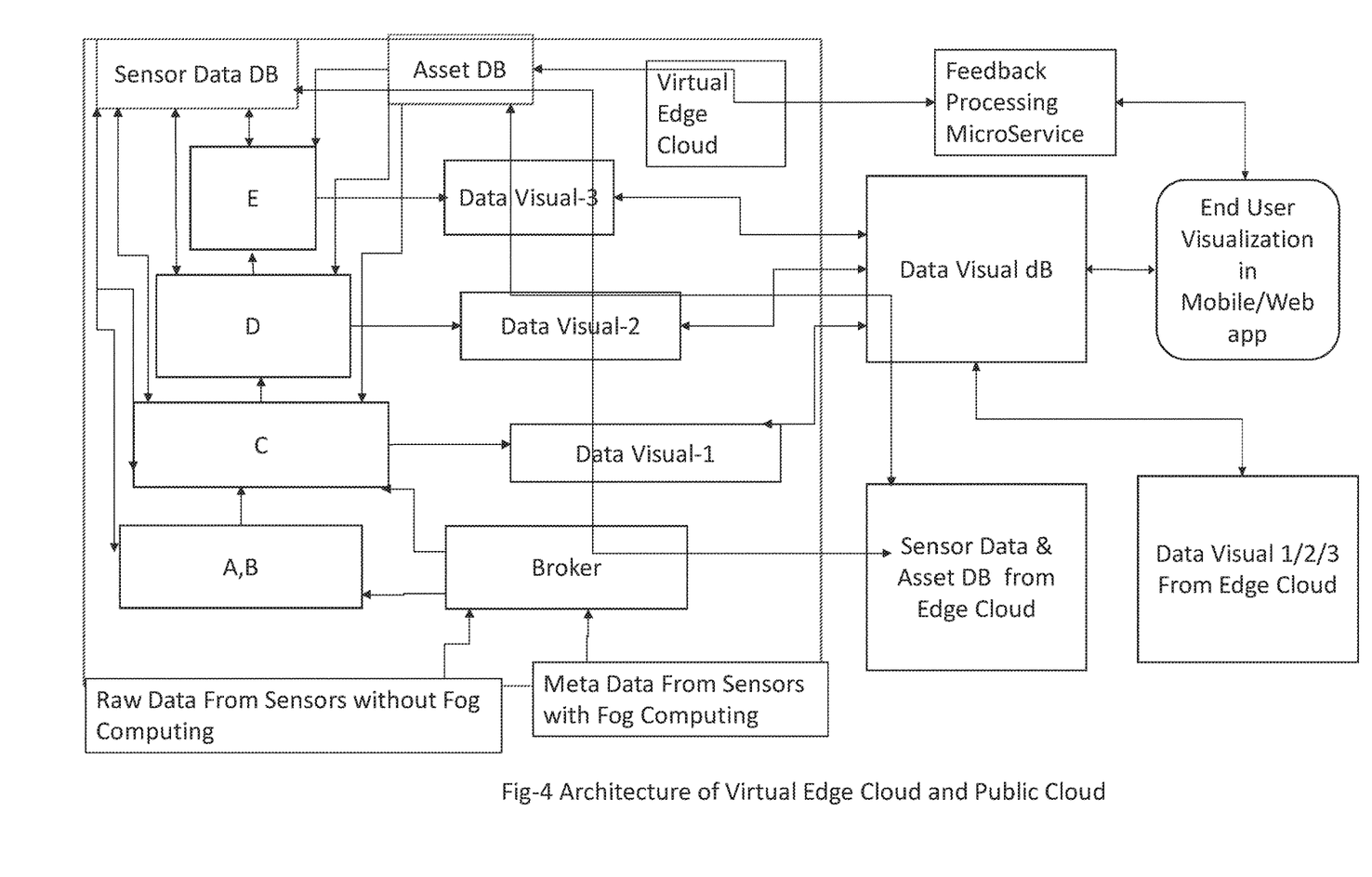
FIG. 4 is a schematic block diagram illustrating a preferred system architecture, the public cloud, and a virtual edge cloud in accordance with the invention.

FIG. 4 illustrates some architecture of the public cloud including a block identified as "virtual edge cloud," which is similar to edge cloud except that with this block data does not need to be fed to a connected mobile device or to a hybrid programmable logic controller/supervisory control and data acquisition system, due to lower latency. Additionally, the sensor time series data base and the asset data base that are in or constitute the virtual edge cloud, in the preferred practice of the invention store such time series data, metadata and asset data of the sensors that are connected and report to the virtual edge cloud, which may be generated from the computations performed in block C and/or block D and/or block E of FIG. 3.

The sensors comprise both "brown" sensors and "green" sensors, where "brown" denotes sensors lacking computational capability and associated electronics and "green" denotes sensors having computational capability with associated electronics being either built into the sensor or located immediately adjacent thereto as respecting the machine from which the sensor is harvests data.

The architecture illustrated in FIG. 4 also performs backup for all of the sensor time series database and asset database data generated in the edge cloud, for use in the event the edge cloud is damaged by hardware being damaged, or stolen, or misplaced, or taken away from the network by disconnection. Visualization data generated by and within computational layer C, and/or D, and/or E is fed directly to a visual database of the public cloud and then to a non-real time visualization device as requested by end users.

Further in the practice of the invention, the asset data base not only stores all of the information about the machines required to build the analytic model provided in blocks C, D and E of FIG. 3; the asset data base also stores all of the feedback information and data given by the users respecting the machines, in the form of texts, images and sound captured by a mobile phone or tablet. Such mobile phone or tablet optionally uses either the "on-premise" mode connected to the edge cloud or operates in a non-real time mode connected to the public cloud; either mode of operation is within the scope of the invention. Feedback by the users is used for adaptive modeling of predictive maintenance in computational layers C and D in FIG. 3. The feedback information is further processed by a feedback processing microservice in the public cloud and is desirably synchronized with the C and D layers of the edge cloud by the asset data base abbreviated "Asset DB" in FIG. 4.

Although schematic implementations of present invention and at least some of its advantages are described in detail hereinabove, it should be understood that various changes, substitutions and alterations may be made to the apparatus and methods disclosed herein without departing from the spirit and scope of the invention as defined by the appended claims. The disclosed embodiments are therefore to be considered in all respects as being illustrative and not restrictive with the scope of the invention being indicated by the appended claims rather than by the foregoing description. All changes which come within the meaning and range of equivalency of the claims are therefore intended to be embraced therein. Moreover, the scope of this patent application is not intended to be limited to the particular implementations of apparatus and methods described in the specification, nor to any methods that may be described or inferentially understood by those skilled in the art to be present as described in this specification.

As disclosed above and from the foregoing description of exemplary embodiments of the invention, it will be readily apparent to those skilled in the art to which the invention pertains that the principles and particularly the compositions and methods disclosed herein can be used for applications other than those specifically mentioned. Further, as one of skill in the art will readily appreciate from the disclosure of the invention as set forth hereinabove, apparatus, methods, and steps presently existing or later developed, which perform substantially the same function or achieve substantially the same result as the corresponding embodiments described and disclosed hereinabove, may be utilized according to the description of the invention and the claims appended hereto. Accordingly, the appended claims are intended to include within their scope such apparatus, methods, and processes that provide the same result or which are, as a matter of law, embraced by the doctrine of the equivalents respecting the claims of this application.

As respecting the claims appended hereto, the term "comprising" means "including but not limited to", whereas the term "consisting of" means "having only and no more", and the term "consisting essentially of" means "having only and no more except for minor additions which would be known to one of skill in the art as possibly needed for operation of the invention." The scope of the invention is, therefore, indicated by the appended claims rather than by the foregoing description and all changes which come within the range of equivalency of the claims are to be considered to be embraced within the scope of the claims. Additional objects, other advantages, and further novel features of the invention will become apparent from study of the appended claims as well as from study of the foregoing detailed discussion and description of the preferred embodiments of the invention, as that study proceeds.

I claim the following:

1. A method of evaluating factory production machinery up time and down time performance, comprising:
   a) providing a collection of sensors in individual communication with factory production machinery, each sensor collecting high frequency vector data as respecting a physical parameter associated with the machinery;
   b) extracting the data from the sensors to produce a sensor data set;
   c) transforming the data set into the frequency domain;
   d) extracting statistical and mathematical information from the data set;
   e) transferring data set, and optionally the extracted statistical and mathematical information, to an associated virtual edge cloud within a public cloud;
   within the associated virtual edge cloud, processing the data set using a rule based algorithm to predict machine reliability and future performance;
   g) within a second section of the associated virtual edge cloud, performing further analytical computations on the data set to provide a repair, maintenance and operation board for the machinery;
   h) within a third section of the associated virtual edge cloud, performing yet further analytical computations on the data set to evaluate up time and down time performance for the factory production machinery;
   i) storing time series data, metadata, and/or asset data from the sensors in a time series data base and an asset data base within the virtual edge cloud;
   j) feeding visualization data generated within the first, second, and third sections of the virtual edge cloud to a visualization data base within the public cloud; and
   k) storing user feedback information and data regarding the factory production machinery in the asset data base.

2. A method of evaluating factory production machinery performance, comprising:
   a) providing a collection of sensors in communication with factory production machinery, each sensor collecting high frequency vector data as respecting physical parameters of the machinery;
   b) extracting the data from the sensors to produce a sensor data set;
   c) transforming the data set into the time domain;
   d) extracting statistical and mathematical information from the data set;
   e) transferring data set, and optionally the extracted statistical and mathematical information, to an associated virtual edge cloud within a public cloud;
   within the associated virtual edge cloud, processing the data set for one machine using a rule based algorithm to predict machine reliability and future performance;
   g) within a second section of the associated virtual edge cloud, performing further analytical computations on the data set to provide a repair, maintenance and operation board for the machine;
   h) within a third section of the associated virtual edge cloud, performing analytical computations on the data set to evaluate performance for the machine;
   i) storing time series data, metadata, and/or asset data from the sensors in a time series data base and an asset data base within the virtual edge cloud;
   j) feeding visualization data generated within the first, second, and third sections of the virtual edge cloud to a visualization data base within the public cloud; and
   k) storing user feedback information and data regarding the factory production machinery in the asset data base.

* * * * *